United States Patent
Yang et al.

(10) Patent No.: US 12,413,442 B1
(45) Date of Patent: Sep. 9, 2025

(54) SMART DEVICE AND A METHOD FOR WIRELESS COMMUNICATION

(71) Applicant: TP-Link Systems Inc., Irvine, CA (US)

(72) Inventors: Tao Yang, Shenzhen (CN); Yuntian Lei, Irvine, CA (US)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 18/967,649

(22) Filed: Dec. 4, 2024

(51) Int. Cl.
*H04L 12/28* (2006.01)
*H04W 76/14* (2018.01)

(52) U.S. Cl.
CPC ......... *H04L 12/2816* (2013.01); *H04W 76/14* (2018.02); *H04L 2012/2841* (2013.01)

(58) Field of Classification Search
CPC .................................................. H04L 12/2816
See application file for complete search history.

(56) References Cited

U.S. PATENT DOCUMENTS

| 10,397,013 | B1* | 8/2019 | Hill | H04L 12/281 |
| 2008/0159280 | A1* | 7/2008 | Hwang | H04W 76/15 |
| | | | | 370/389 |
| 2015/0281871 | A1* | 10/2015 | Poulsen | H04W 4/70 |
| | | | | 370/328 |
| 2019/0110176 | A1* | 4/2019 | Hoellerbauer | H04W 76/40 |
| 2019/0179785 | A1* | 6/2019 | Keeth | H01L 23/5385 |
| 2021/0314407 | A1* | 10/2021 | Ng | G06F 16/284 |

FOREIGN PATENT DOCUMENTS

| CN | 109765825 | A | | 5/2019 | |
| CN | 111447568 | A | | 7/2020 | |
| CN | 111491316 | A | | 8/2020 | |
| CN | 112433480 | B | | 11/2022 | |
| CN | 117319927 | A | | 12/2023 | |
| CN | 118524161 | A | * | 8/2024 | ............. H04L 67/12 |
| WO | WO-0152478 | A2 | * | 7/2001 | ............. F25D 29/00 |

* cited by examiner

*Primary Examiner* — Suresh Suryawanshi
(74) *Attorney, Agent, or Firm* — Loeb & Loeb LLP

(57) ABSTRACT

The disclosure provides a smart device and a method for wireless communication performed by the smart device. The method includes receiving a first control message that complies with a first communication protocol and a second control message that complies with a second communication protocol, wherein the first control message and the second control message indicates a same action to be performed by the smart device; executing an action indicated by one of the first control message and the second control message, wherein the first communication protocol is different from the second communication protocol.

20 Claims, 8 Drawing Sheets

60

S601 — Receiving a first control message that complies with a first communication protocol and a second control message that complies with a second communication protocol, wherein the first control message and the second control message indicate a same action to be performed by the smart device S602 — Executing an action indicated by one of the first control message and the second control message, wherein the first communication protocol is different from the second communication protocol

SMART DEVICE AND A METHOD FOR WIRELESS COMMUNICATION

TECHNICAL FIELD

The disclosure relates to the technical field of wireless communication, in particular to a smart device, a method for wireless communication performed by a smart device, and nonvolatile computer-readable storage medium.

BACKGROUND

Smart home control systems typically use Wi-Fi for networking and communication. By connecting various smart devices within the home via Wi-Fi, users can control and manage these devices through a centralized interface. This provides convenience and flexibility in home automation, allowing users to remotely adjust settings, monitor energy usage, and enhance security measures.

Currently, some smart home control systems also support BLE Mesh (Bluetooth Low Energy Mesh), a technology that extends connectivity options. BLE Mesh is a network protocol based on Bluetooth Low Energy (BLE) that enables many-to-many (M2M) communication between devices. It is designed to allow devices to communicate in a mesh topology, meaning each device (or node) can relay data to others, forming a network that covers a larger area than the range of a single device. BLE Mesh provides a decentralized and scalable network, allowing devices to communicate directly with each other without relying on a central hub. This ensures greater flexibility and reduces the strain on traditional Wi-Fi networks, especially in larger environments where multiple devices are used simultaneously.

Some smart home control systems rely entirely on strong Wi-Fi, so connection issues can disrupt control. Others depend on a central gateway, which, if offline, causes devices to lose remote functionality. In hybrid systems, devices support two protocols but use only one per command, lacking dynamic switching, which leads to failures if the chosen protocol is disrupted.

Thus, there is a need to propose improvements to existing smart home control systems.

SUMMARY

According to an aspect of the present application, a smart device is provided. The smart device comprises a memory for storing control IDs; and one or more processors operatively coupled to the memory, the one or more processors configured to: receive a first control message that complies with a first communication protocol and a second control message that complies with a second communication protocol, wherein the first control message and the second control message indicates a same action to be performed by the smart device; and execute the action indicated by one of the first control message and the second control message, wherein the first communication protocol is different from the second communication protocol.

According to another aspect of the present application, a method for wireless communication performed by a smart device is provided. The method comprises: receiving a first control message that complies with a first communication protocol and a second control message that complies with a second communication protocol, wherein the first control message and the second control message indicate a same action to be performed by the smart device; executing an action indicated by one of the first control message and the second control message, wherein the first communication protocol is different from the second communication protocol.

According to another aspect of the present application, a computer-readable storage medium, which has stored thereon computer programs which, when executed by the processor of a smart device coupled to the memory for storing control IDs, cause the processor to perform: receive a first control message that complies with a first communication protocol and a second control message that complies with a second communication protocol, wherein the first control message and the second control message indicate a same action to be performed by the smart device; and execute the action indicated by one of the first control message and the second control message, wherein the first communication protocol is different from the second communication protocol.

According to another aspect of the present application, a smart device is provided, which comprises: a processor, and a memory having stored thereon computer programs which, when executed by the processor, cause the processor to perform the above method.

BRIEF DESCRIPTION OF THE DRAWINGS

In order to more clearly explain the embodiments of present application or the technical solution in the prior art, the drawings needed to be used in the description of the embodiments of present application or the prior art will be briefly introduced below. Obviously, the drawings in the following description are only some embodiments recorded in present application, and other drawings may be obtained according to these drawings of the embodiments of present application for those skilled in the art.

DETAILED DESCRIPTION

Figure 1:
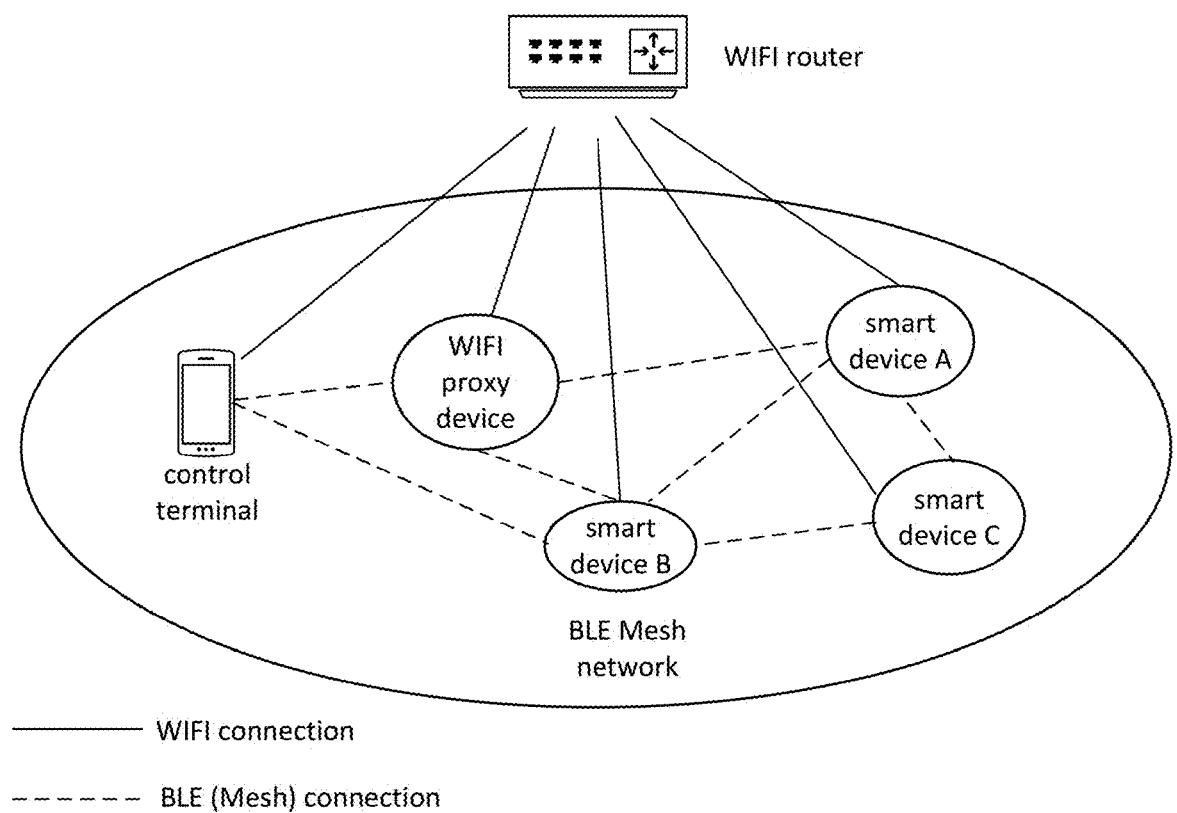
FIG. 1 illustrates an application scenario according to one embodiment of the present disclosure.

In order to provide a clearer and more complete description of the purpose, technical solution, and advantages of the present disclosure, the following description, in conjunction with the accompanying drawings, will provide a clear and comprehensive understanding of the technical solution in the present disclosure. It is to be noted that the described embodiments are only a part of the embodiments disclosed herein, and not the entire embodiments. All other embodiments that ordinary skilled persons in the art can obtain without exercising inventive labor based on the embodiments disclosed herein are within the scope of the present disclosure.

The terms "first," "second," "third," "fourth," etc. (if present) used in the specification and claims, as well as in the accompanying drawings, are used to distinguish similar objects and are not necessarily used to describe a specific order or sequence. It is to be understood that the use of such data may be interchangeable in appropriate circumstances, so that the embodiments of the present disclosure described herein may be implemented in an order other than that shown or described here.

It is to be understood that the numbering of the processes in various embodiments of the present disclosure does not imply a specific order of execution. The execution order of the processes should be determined based on their functionality and inherent logic, and should not impose any limitations on the implementation process of the embodiments of the present disclosure.

It is to be understood that the terms "comprising" and "having" and their variations intend to cover non-exclusive inclusion, such as a process, method, system, product, or apparatus that includes a series of steps or units, not necessarily limited to those explicitly listed, but may include other steps or units that are inherently present in these processes, methods, products, or apparatus.

It is to be understood that the term "multiple" means two or more. The term "and/or" is merely a description of the associated relationship between related objects, indicating that there may be three possible relationships. For example, "A and/or B" can mean: A exists alone, A and B exist simultaneously, or B exists alone. The character "/" generally indicates an "or" relationship between the preceding and following related objects. "Including A, B, and C," "including A, B, C" means that A, B, and C are all included, and "including A, B, or C" means that one of A, B, and C is included. "Including A, B and/or C" means that any one or two or all three of A, B, and C are included.

It is to be understood that "corresponding to B with A," "corresponding to A with B," "A corresponds to B," or "B corresponds to A" means that B is associated with A and may be determined based on A. Determining B based on A does not mean that B can only be determined based on A, but can also be determined based on A and/or other information. The matching of A and B means that the similarity between A and B is greater than or equal to a predetermined threshold.

Depending on the context, the term "if" used herein may be interpreted as "when" or "in response to determining" or "in response to detecting."

The following specific embodiments will provide a detailed description of the technical solution of the present disclosure. These specific embodiments may be combined with each other, and certain concepts or processes may not be reiterated in some embodiments if they are the same or similar. In order to provide a clearer understanding of the purpose, technical solution, and advantages of the present disclosure, the following description will be provided in conjunction with the accompanying drawings.

In one type of smart home control system, all smart devices are solely equipped with Wi-Fi connectivity, using it to connect to the router for sending and receiving control messages. There is no direct communication link established between the smart devices themselves. Control devices, such as smartphones, communicate with smart devices by either connecting to the local Wi-Fi network or through a cloud server, which relays control commands to local Wi-Fi-enabled devices. This setup relies entirely on Wi-Fi, and since smart devices are scattered throughout the home, strong Wi-Fi coverage is necessary. Otherwise, connection drops may occur, negatively impacting the user experience.

In another type of smart home control system, there is a gateway that supports both Wi-Fi and BLE Mesh, along with several BLE Mesh devices. Control devices, like smartphones, connect to the local Wi-Fi network, and the gateway forwards control commands to BLE Mesh devices. Alternatively, control devices connect to a cloud server, which relays commands to the local Wi-Fi gateway and then forwards them to the BLE Mesh devices. In this system, BLE Mesh devices are entirely dependent on the gateway for relaying remote control commands, and if the gateway goes offline, remote control commands will fail as well.

In yet another type of smart home control system, there are multiple devices that support both Wi-Fi and BLE Mesh, forming a local network using BLE Mesh. When the required communication speed exceeds a certain threshold, a Wi-Fi connection is established. However, the system only uses one wireless protocol for communication at any given time, without fully utilizing both protocols to enhance system reliability. Although the system employs both Wi-Fi and BLE Mesh protocols, in practice, communication for a certain command only follows a single path. If the selected protocol is disrupted or the network topology changes, the system may fail to switch to the other protocol, resulting in control failures.

Therefore, this disclosure proposes improvements to smart home control systems to reduce communication costs, increase the success rate of remote control, and enhance the user experience.

Thus, this disclosure provides a smart device, comprising: a memory; and one or more processors operatively coupled to the memory, the one or more processors configured to: receive a first control message that complies with a first communication protocol and a second control message that complies with a second communication protocol, wherein the first control message and the second control message indicates a same action to be performed by the smart device; and execute the action indicated by one of the first control message and the second control message, wherein the first communication protocol is different from the second communication protocol.

The embodiment of this disclosure relates to a smart home control system based on multiple protocols, such as Wi-Fi and BLE Mesh. These multi-protocol smart devices maintain multiple wireless links simultaneously. Control commands are transmitted in parallel across these multiple wireless links, and a deduplication algorithm is used to prevent commands from being executed more than once. This ensures efficient and reliable communication between smart devices, even when some pathways are not available.

Additionally, this embodiment can incorporate a dynamic gateway election mechanism, allowing the system to automatically adapt to changes in network topology. This feature enhances the user experience by ensuring that the smart home network remains stable and responsive to shifting conditions, such as device additions or failures.

Figure 2:
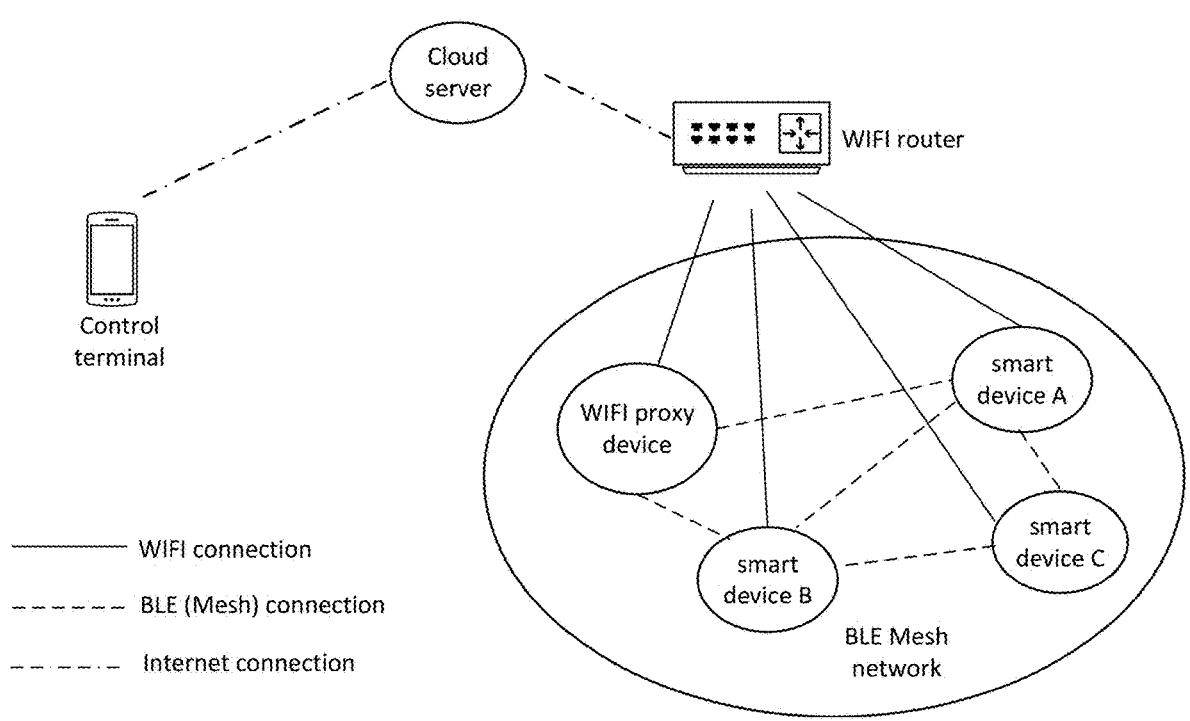
FIG. 2 illustrates an alternative application scenario according to one embodiment of the present disclosure.

The following sections, with reference to FIGS. 1 and 2, explain the application scenarios of the embodiment presented in this disclosure. FIG. 1 illustrates an application scenario according to one embodiment of the present disclosure, while FIG. 2 shows an alternative application scenario according to one embodiment of the present disclosure. In FIGS. 1-2, lines with the same style may correspond to the communication connections that comply with the same communication protocol.

As depicted in FIGS. 1 and 2, a smart home control system may include a variety of devices. These may include, but are not limited to: Wi-Fi routers, control terminals, smart devices, Wi-Fi proxy devices, and cloud servers. It is noted that the present disclosure is not confined to these examples, and other devices may also be integrated depending on system requirements and configurations.

The Wi-Fi router may serve as a hub for establishing a wireless network within the home environment. It may facilitate connectivity among all devices by creating a local area network (LAN) that operates over Wi-Fi. This router may act as a bridge to the internet, allowing devices to communicate with external servers or cloud services. Depending on the smart home system's configuration, the router may support dual-band frequencies (2.4 GHz and 5 GHz) for optimized performance and may offer advanced features like Quality of Service (QOS) to prioritize traffic between smart devices and other household equipment.

The control terminal may be equipped with both a Wi-Fi communication module and a BLE Mesh communication module, enabling it to connect seamlessly to various devices. Through the Wi-Fi module, the control terminal may establish a connection with the Wi-Fi router, ensuring access to the broader network. At the same time, the BLE Mesh communication module may enable a direct link to smart devices, creating a robust and decentralized network of interconnected devices. An example of such a control terminal may be a smartphone or tablet, through which users may interact with the smart devices in the smart home system. By utilizing dedicated apps or software, users may issue commands, monitor device status, and perform automation tasks.

Smart devices within the smart home system may feature both Wi-Fi and BLE Mesh communication modules. These devices may connect to the Wi-Fi router for internet access or network-wide communication. Simultaneously, these devices may establish BLE Mesh connections with the control terminal and other smart devices in the network. By doing so, these devices may enable a distributed mesh network where commands may be relayed across multiple devices. These smart devices may be designed to perform specific actions based on user commands received from the control terminal, such as turning on lights, adjusting thermostats, or activating security cameras.

The Wi-Fi proxy device, which may also be a smart device, may be elected or pre-designated within the BLE Mesh network. Its role may involve acting as an intermediary, forwarding control commands between the Wi-Fi and BLE Mesh networks. This proxy device may streamline communication by ensuring that devices operating on different network protocols (Wi-Fi and BLE Mesh) can interact effectively. The election process for this role may be automated, allowing the system to dynamically select the most suitable device based on network conditions, or it may be manually configured by the user.

The cloud server may play a role in enabling remote control capabilities. The control terminal and smart devices may connect to the cloud server via the internet, allowing for data exchange and command forwarding between devices. This server may facilitate remote access to the system, enabling users to monitor and control their smart home environment from any location. Through cloud-based processing, the server may also provide additional features, such as data analytics, machine learning for device behavior optimization, and integration with third-party services for enhanced functionality.

As shown in FIG. 1, if the control terminal is within the coverage range of the BLE Mesh network, it may connect to the Wi-Fi router via Wi-Fi. Once connected, the control terminal may send remote control commands through the Wi-Fi router, which may then forward these commands to various smart devices and Wi-Fi proxy devices. The Wi-Fi proxy device, in turn, may forward the commands to other smart devices within the network. Additionally, the control terminal may also establish a direct BLE Mesh connection with smart devices within range, allowing it to send remote control commands directly to these devices.

As shown in FIG. 2, if the control terminal is outside the coverage range of the BLE Mesh network, it may no longer be able to directly connect to the smart devices through BLE Mesh. In this scenario, the control terminal may first send remote control commands to a cloud server. The cloud server may then forward these commands to the Wi-Fi router via the internet. Upon receiving the remote control commands from the cloud server, the Wi-Fi router may transmit the commands to the relevant smart devices and Wi-Fi proxy devices using the Wi-Fi connection. The Wi-Fi proxy device, similarly, may then forward the commands to other smart devices within the BLE Mesh network.

Figure 3:
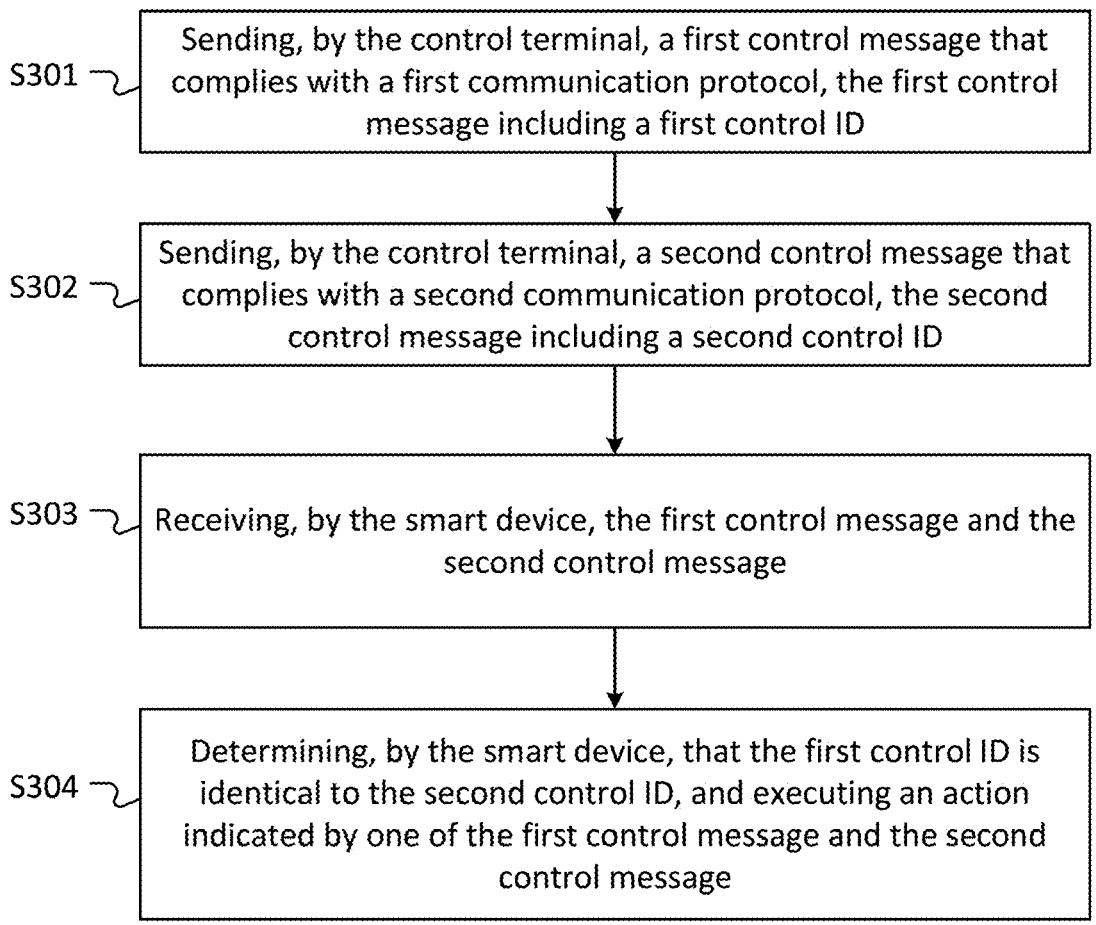
FIG. 3 illustrates a flowchart of the method executed by the smart home control system according to the embodiment of the present disclosure.

Next, referring to FIG. 3, method 30 executed by a smart home control system according to the embodiment of the present disclosure is provided. FIG. 3 illustrates a flowchart of method 30 executed by the smart home control system according to the embodiment of the present disclosure.

The smart home control system according to the embodiment of the present disclosure includes a control terminal, smart devices, and optionally includes a Wi-Fi router, a Wi-Fi proxy device, and a cloud server. It is noted that the present disclosure is not confined to these examples, and other devices may also be integrated depending on system requirements and configurations.

At step S301, the control terminal sends a first control message that complies with a first communication protocol, the first control message including a first control ID. For example, the control terminal may send the first control message to the smart device via a first communication connection that complies with the first communication protocol.

At step S302, the control terminal sends a second control message that complies with a second communication protocol, the second control message including a second control ID. For example, the control terminal may send the second control message to the smart device via a second communication connection that complies with the second communication protocol.

The first communication protocol or the second communication protocol is a set of rules and conventions that govern the exchange of data between devices in a network, ensuring proper transmission and interpretation. The first communication protocol and the second communication protocol are different. Due to the differences between the first and second communication protocols, the communication devices involved in sending the first control message to the smart device via the first communication connection, which complies with the first communication protocol, and the communication devices involved in sending the second control message to the smart device via the second communication connection, which complies with the second communication protocol, may also be different.

For example, the first communication connection might involve a Wi-Fi connection, while the second communication connection might involve a BLE (or BLE Mesh) connection. In this case, on the path of the first communication connection, the control device sends the first control message to the Wi-Fi router, and the Wi-Fi router forwards the first control message to the smart device. On the path of the second communication connection, the control device directly sends the second control message via the BLE Mesh network.

The first control ID and second control ID are identifiers used in different communication protocols to indicate actions that the smart devices are expected to execute. These control IDs serve to distinguish specific control commands, ensuring that the device executes the correct actions. They may be located within fields in the application layer of different communication protocols. By sending messages simultaneously over multiple paths—such as a first communication connection adhering to the first protocol and a second communication connection adhering to the second protocol—the success rate of control operations is improved, minimizing the risk of communication failure due to the disconnection of any single communication link.

At step S303, the smart device receives the first control message and the second control message. For example, the smart device receives the first control message and the second control message via the first communication connection and the second communication connection, respectively. Depending on the network environment, the first control message and the second control message may be received at different times.

At step S304, the smart device determines that the first control ID is identical to the second control ID, and then executes the action indicated in one of the first control message and the second control message. The smart device can parse the first control message and the second control message, and by determining that the first control ID is identical to the second control ID, it determines that the first control message and the second control message are actually messages indicating that the smart device should perform the same action. To avoid the smart device executing the same action twice, the smart device will only execute one action indicated by both the first control message and the second control message.

For example, the control terminal may be a smartphone, and the smart device may be an air conditioner. The control terminal may send both a first message and a second message, with each message instructing the air conditioner to switch to cooling mode. Both messages may carry the same control ID, indicating that they correspond to the same control operation. The air conditioner, upon receiving the first and second messages through communication connections based on different protocols, may check that both messages share the same control ID. Once this is confirmed, the air conditioner may selectively process and execute one of the two messages, ensuring that only one action is performed to avoid redundancy.

In the smart home control system according to the embodiment of the present disclosure, by transmitting messages over multiple communication links in parallel and utilizing a message deduplication mechanism, the range of message delivery may be expanded. Method 30 may increase the success rate of message processing and execution by sending the same instruction across different communication paths. Even if one path experiences a failure, the other path may still successfully deliver the message, reducing the likelihood of communication failure and improving overall reliability.

Figure 4:
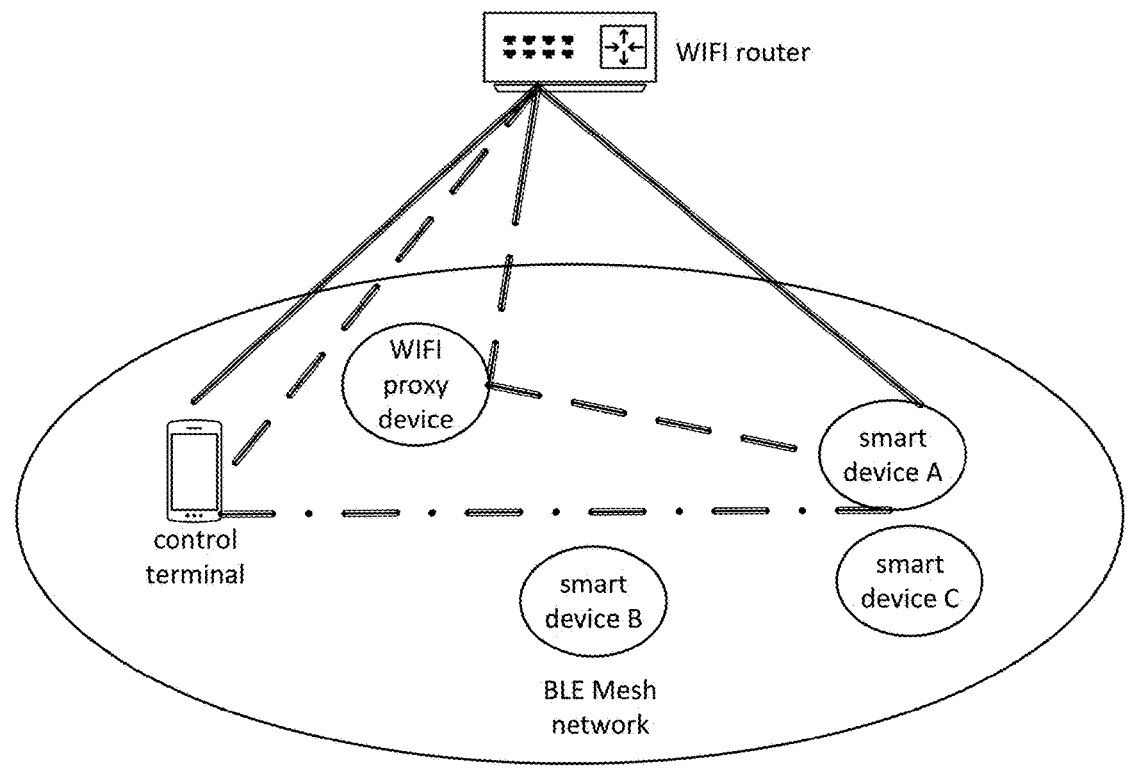
FIG. 4 illustrates a schematic diagram of the smart home system executing method according to embodiments of this disclosure.

Next, method 30 may be further illustrated using FIG. 4 as an example. FIG. 4 shows a schematic diagram of the smart home system executing method 30 according to embodiments of this disclosure. The example depicted in FIG. 4 may share the same topology as that in FIG. 1. For the sake of clarity, some connection identifiers have been omitted in the illustration. In FIG. 4, lines with the same style may correspond to the same communication connection.

As shown in FIG. 4, there may be three communication connections labeled with communication connection A, communication connection B, and communication connection C, respectively. The first and second communication connections may be any of these three, as long as the first and second connections are different.

Communication connection A may be referred to as BLE Mesh direct control connection, where the control terminal directly sends messages that comply with BLE Mesh protocol through a BLE Mesh network to control the smart device. The messages are propagated through the mesh network, potentially hopping between multiple nodes, until they reach the target smart device. Communication connection A leverages the mesh topology of BLE, allowing for extended range and improved reliability.

Communication connection B may be referred to as connection via a Wi-Fi proxy device, where the control terminal sends a control message to the Wi-Fi proxy device through a Wi-Fi network. The proxy device may act as a gateway, translating the message that complies with Wi-Fi protocol into a control message that complies with BLE Mesh protocol. The proxy device may then relay the control message that complies with BLE Mesh protocol via the BLE Mesh network to the smart device.

Communication connection C may be referred to as Wi-Fi direct control connection, where the control terminal sends a control message that complies with Wi-Fi protocol directly over the Wi-Fi network to control the smart device. The control terminal sends a control message that complies with Wi-Fi protocol to the Wi-Fi router. The Wi-Fi router then relays the control message to the smart device through the Wi-Fi connection.

Figure 5:
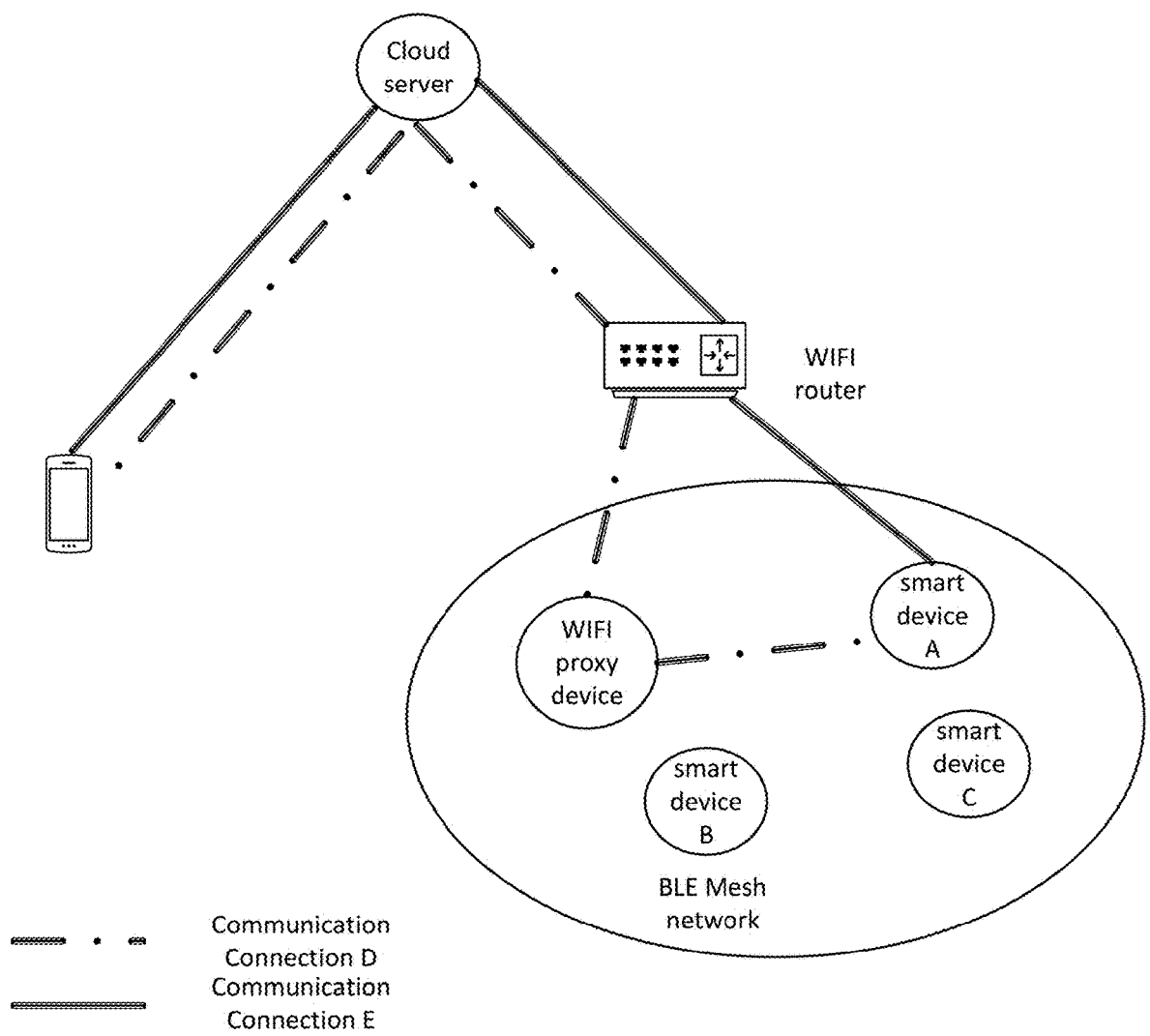
FIG. 5 illustrates another schematic diagram of the smart home system executing the method according to embodiments of this disclosure.

Next, method 30 may be further illustrated using FIG. 5 as an example. FIG. 5 shows another schematic diagram of the smart home system executing method 30 according to embodiments of this disclosure. The example depicted in FIG. 5 may share the same topology as that in FIG. 3. For the sake of clarity, some connection identifiers have been omitted in the illustration. In FIG. 5, lines with the same style may correspond to the same communication connection.

As shown in FIG. 5, there may be three communication connections labeled with communication connection D and communication connection E, respectively. The first and second communication connections may be any of the two, as long as the first and second connections are different.

Communication connection D may be referred to as a connection via cloud server relay control. Through communication connection D, the control terminal sends control messages to a cloud server, which then directly transmits these messages to the Wi-Fi router via Internet connection. The cloud server acts as an intermediary, processing the control messages and securely relaying them to the Wi-Fi router. The Wi-Fi router then relays the control messages to the target smart device (smart device A) over a Wi-Fi connection.

Communication connection E, referred to as a connection via control of cloud server and Wi-Fi proxy device. Through communication connection E, the control terminal first sends control messages to a cloud server. The cloud server then relays these messages via Wi-Fi to the Wi-Fi router via an Internet connection. The Wi-Fi router then relays the control messages to a Wi-Fi proxy device via a Wi-Fi connection. The Wi-Fi proxy device transmits the control messages to the smart device using BLE Mesh technology. This hybrid communication connection combines the benefits of cloud-based control with the advantages of local BLE Mesh networks.

By simultaneously sending messages through multiple paths, the success rate of control operations may be significantly improved. Taking smart device A from FIGS. 4 and 5 as an example, if the Wi-Fi connection for smart device A becomes unavailable, the command may still reach the device through two alternative paths: direct control via BLE Mesh and control through the Wi-Fi proxy device. Conversely, if the BLE Mesh connection is disrupted, the command may still arrive via direct control over Wi-Fi. Additionally, if the Wi-Fi proxy device becomes non-functional, the command may still be transmitted through both direct control via BLE Mesh and direct Wi-Fi control.

However, sending the same command through different paths simultaneously may lead to issues with message duplication. To address this, the smart terminal may execute method 60 according to the embodiment of the present disclosure to ensure that even if multiple duplicate messages are received, the command may only be executed once.

Figure 6:
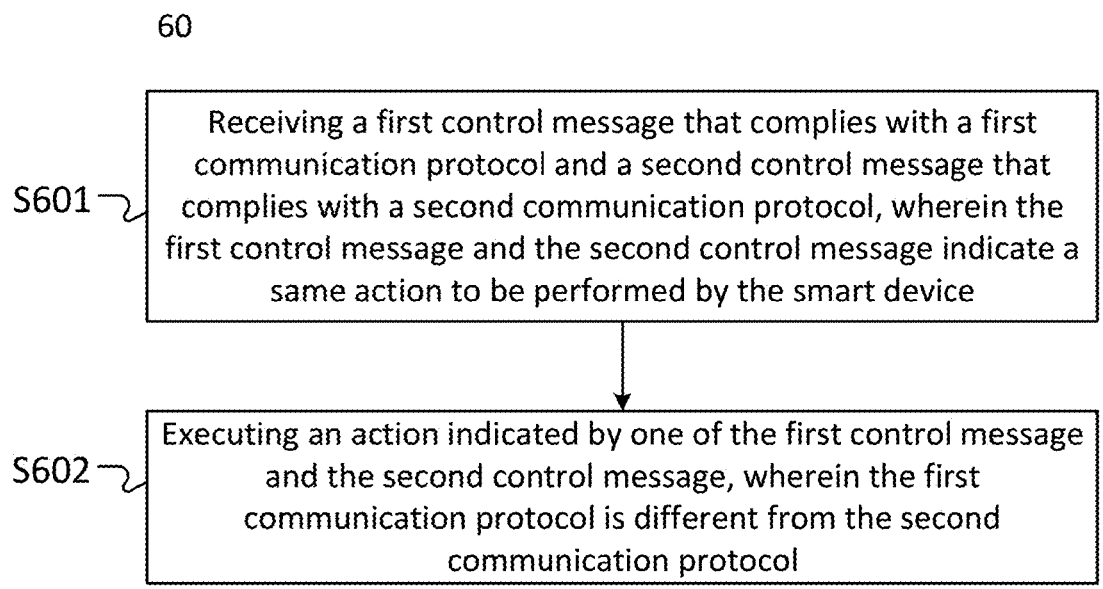
FIG. 6 illustrates a flowchart of a method executed by a smart device according to the embodiment of the present disclosure.

FIG. 6 illustrates a flowchart of method 60 executed by a smart device (for example, smart device A in FIGS. 4-5) according to the embodiment of the present disclosure. The smart device, comprises a memory for storing control IDs and one or more processors operatively coupled to the memory.

As shown in FIG. 6, method 60 may include steps S601 to S604. Method 60 may also include more or fewer steps, and steps S601 to S604 may also include one or more sub-steps.

At step S601, the smart device receives a first control message that complies with a first communication protocol and a second control message that complies with a second communication protocol, wherein the first control message and the second control message indicate a same action to be performed by the smart device. It is worth noting that the first and second control messages may be received either simultaneously or at different timings. The present disclosure is not limited thereto.

For example, the first control message may include a first control ID and the second control message may include a second control ID. The smart device may determine that the first control ID is identical to the second control ID. For example, if the first message arrives at the smart device earlier than the second message, the smart device may store, a first control ID included in the first control message, into the memory for storing control IDs. When the second message arrives, the smart device may retrieve the second control ID in memory for storing control IDs. If it is determined that the first control ID is identical to the second control ID, the smart device may determine that the first control message and the second control message indicate a same action to be performed by the smart device. Optionally, the memory for storing control IDs is a memory for storing control IDs that correspond to actions (recently) executed by the smart device.

At step S602, the smart device executes the action indicated by one of the first control message and the second control message. In response to an absence of the first control ID in the memory for storing control IDs, the smart device may execute an action indicated by the second control message, and stores the second control ID in the memory for storing control IDs. In response to a presence of a first control ID in the memory for storing control IDs identical to the second control ID, the smart device may ignore the second control message, wherein the second control ID is obtained from a second control message that complies with a second communication protocol, and the first communication protocol is different from the second communication protocol.

Specifically, if the second control ID in the second control message is identical to the first control ID already stored in memory, the second control message is considered a duplicate. The smart device will then check whether the corresponding operation for the second control ID has already been executed. Instead of re-executing the same action, the smart device may ignore the first message. This approach prevents redundant actions, ensuring that the smart device's response is not compromised by unnecessary resource consumption or erroneous actions due to repeated control messages. After ignoring the second control message, the smart device will continue to wait for subsequent new control messages. The disclosure is not limited thereto.

Optionally, Method 60 may also include removing, from the memory for storing control IDs, a control ID that exceeds a predetermined aging time; or removing, from the memory for storing control IDs, a control ID with the oldest timestamp, in responding to reaching a maximum number of entries. The disclosure is not limited thereto.

Specifically, the control terminal sends a control message to the smart device that includes a unique control ID each time, which identifies the specific action that the control terminal expects the smart device to perform. Different copies of control messages (for example, the first control message and the second control message) sharing the same control ID are transmitted via various paths, such as the Communication Connections A-D described above, ensuring that these control messages retain the same control ID.

The smart device will maintain a memory for storing control IDs to record the recently executed command IDs. This memory will clear control IDs that exceed a predetermined aging time or, if the maximum number of entries is reached, will remove the oldest control ID. Upon receiving control messages, the smart device will search its cache for the control ID. If the control ID is not found, the device will execute the command and add the control ID to the memory for storing control IDs; otherwise, it will disregard the message.

Thus, by executing method 60 according to the embodiment of the present disclosure, the smart terminal ensures that even if multiple duplicate messages are received, the expected action will be executed only once.

Additionally, in the smart home control system according to the embodiment of the present disclosure, multiple smart devices may each possess Wi-Fi proxy functionality. In such cases, multiple smart devices might compete for the role of Wi-Fi proxy device to ensure that devices operating on different network protocols (Wi-Fi and BLE Mesh) can effectively communicate.

Figure 7:
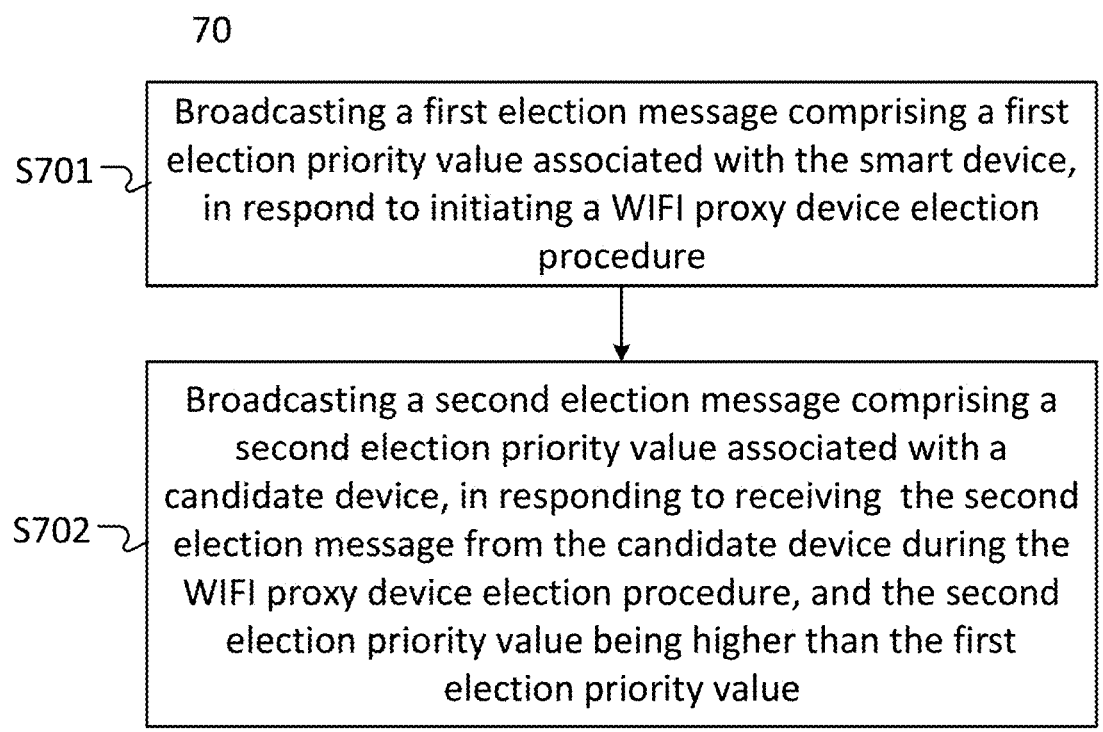
FIG. 7 illustrates a flowchart of a method executed by a smart device according to the embodiment of the present disclosure.

Next, with reference to FIG. 7, a method 70 is described as an example for the operation of smart devices according to the embodiment of the present disclosure. The smart device is configured to participate in electing a Wi-Fi proxy device within a network. The smart device, comprises a memory and one or more processors operatively coupled to the memory. As an example, the smart device may be the same device executing the method 60 described above.

As shown in FIG. 7, the method 70 may include steps S701 to S702. The method 70 may also include more or fewer steps, and steps S701 to S702 may also include one or more sub-steps.

At step S701, the smart device broadcasts a first election message comprising a first election priority value associated with the smart device, in responding to initiating a Wi-Fi proxy device election procedure.

For example, upon joining the smart home control system, any smart device capable of acting as a Wi-Fi proxy can send these first election messages, by default nominating itself. The first election message contains data necessary to determine the first election priority value, including details such as the smart device's MAC address, serial number (SN), Wi-Fi Received Signal Strength Indicator (RSSI), and hardware specifications of the smart device.

At step S702, the smart device broadcasts a second election message comprising a second election priority value associated with a candidate device, in responding to receiving the second election message from the candidate device during the Wi-Fi proxy device election procedure, and the second election priority value being higher than the first election priority value.

For example, when the smart device receives a broadcasted election message from another candidate device, it compares the election priority value (for example the second election priority value) contained in the received message with its own previously broadcasted priority information, which is first election priority value. If the second election priority value in the received message is higher than its own, the device will then rebroadcast the information of the higher-priority candidate; otherwise, it will disregard the message.

After a period, all smart devices within the network will have broadcasted the information of the candidate with the highest priority. At this point, the candidate with the highest priority becomes the elected Wi-Fi proxy device.

Thus, the network performance is optimized through intelligent priority-based selection that considers multiple critical factors such as RSSI and hardware capabilities, ensuring the most capable device serves as a proxy with optimal wireless signal conditions.

In some embodiment according to the disclosure, method 70 may further include periodically broadcasting a proxy heartbeat message declaring the existence of the smart device as an elected Wi-Fi proxy device, wherein the broadcasting is performed subsequent to the smart device being elected as the Wi-Fi proxy device during the Wi-Fi proxy device election procedure. The smart device being elected as the Wi-Fi proxy device only broadcasts the first election message and does not broadcast the second election message during the Wi-Fi proxy device election procedure.

More specifically, once a smart device has been elected as the Wi-Fi proxy, it periodically sends a "heartbeat message" to announce its ongoing presence and role as the Wi-Fi proxy device within the network. This heartbeat message acts as a signal to other smart devices within the smart home control system, confirming that the Wi-Fi proxy device is active and available, allowing them to continue routing communications through it for inter-protocol interactions. The regular interval of these heartbeat messages ensures that any disruptions in the Wi-Fi proxy's availability may be quickly detected, prompting other devices to potentially initiate a new election process if the proxy is no longer active.

Optionally, if the BLE Mesh network fails to receive heartbeat messages from the current Wi-Fi proxy device for a predetermined time period, it automatically triggers a new election process to select a replacement proxy device, ensuring continuous network operation. Thus, in some embodiments according to the disclosure, method 70 may further include initiating the Wi-Fi proxy device election responsive to failing to receive, within a predetermined time period, a proxy heartbeat message from a current Wi-Fi proxy device.

Thus, the smart home control system according to the present disclosure adopts a broadcast voting mechanism. The system's self-healing network resilience, enabled by heartbeat monitoring and automatic re-election, prevents single points of failure while eliminating the need for manual intervention. The broadcast-and-update mechanism achieves efficient convergence with reduced network traffic compared to centralized voting approaches, while eliminating the need for complex coordination or a central election authority. The distributed voting architecture provides excellent scalability, allowing new devices to seamlessly join the election process while handling network topology changes automatically. Resource conservation is achieved through minimal memory overhead, simple priority comparisons, and reduced bandwidth usage by eliminating redundant messages.

Figure 8:
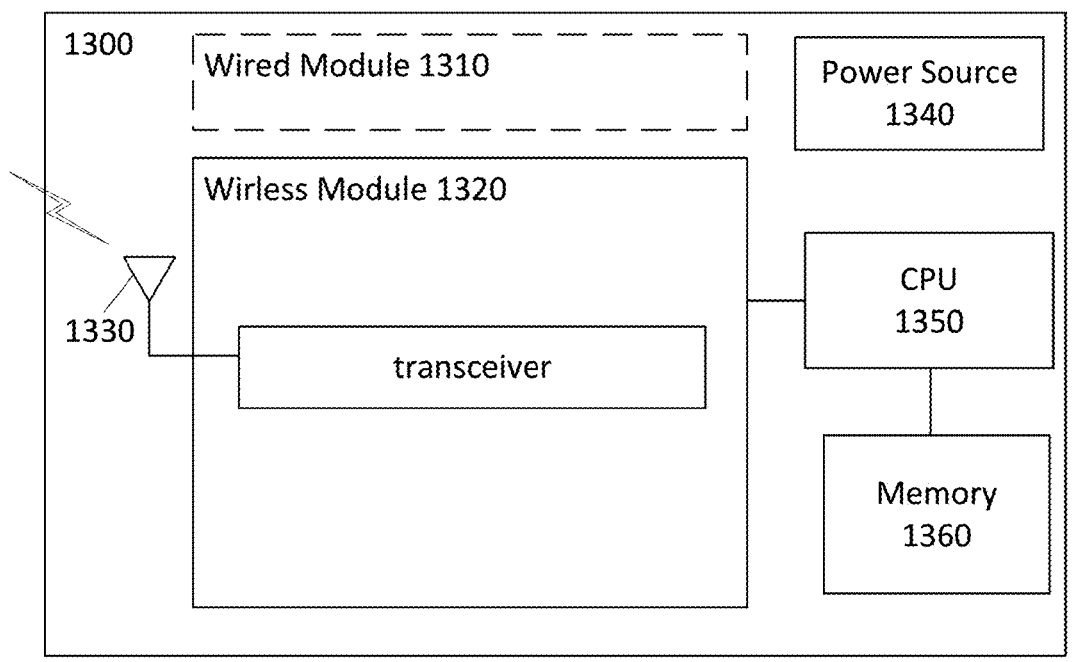
FIG. 8 shows an example configuration of a communication device according to an embodiment of the present disclosure.

Further, FIG. 8 shows an example configuration of a communication device 1300, for example, a smart device, according to an embodiment of the present disclosure. The communication device 1300 may include a Wired circuit 1310 (optional), a Wireless circuit 1320, at least one antenna 1330 (for the sake of simplicity, only one antenna is shown in FIG. 7), a power source 1340, a central processing unit (CPU) 1350 and at least one memory 1360. The transceiver may be used to establish a link and transmit/receive signal over a channel of the link via the antenna 1330. The Wireless circuit 1320 and the CPU 1350 may function together as a circuit of the communication device 1300 configured to perform methods (e.g., method 20) as described in the present disclosure. It is to be understood that the configuration of the smart device according to the present disclosure is merely as an example, but not a limitation. The configuration of the communication device in the present disclosure can comprise more or less components than those in FIG. 8.

According to another aspect of the present disclosure, there is provided a computer-readable storage medium for storing a computer-readable program, the program causing a computer to perform the method for wireless communication as described above.

Techniques for wireless communication may include additional aspects, such as any single aspect or any combination of aspects described below and/or in connection with one or more other processes described elsewhere herein.

In a first aspect, a smart device is provided. The smart device comprises: a memory; and one or more processors operatively coupled to the memory for storing control IDs, the one or more processors configured to: receive a first control message that complies with a first communication protocol and a second control message that complies with a second communication protocol, wherein the first control message and the second control message indicates a same action to be performed by the smart device; and execute the action indicated by one of the first control message and the second control message, wherein the first communication protocol is different from the second communication protocol. For example, the one or more processors configured to: receive a second control message that complies with a second communication protocol, the second control message including a second control ID; retrieve the second control ID in the memory for storing control IDs; in response to an absence of the second control ID in the memory for storing control IDs, perform an action indicated by the second control message, and store the second control ID in the memory for storing control IDs, and in response to a presence of a first control ID in the memory for storing control IDs identical to the second control ID, ignore the second control message, wherein the second control ID is obtained from a second control message that complies with a second communication protocol, and the first communication protocol is different from the second communication protocol.

In a second aspect, alone or in combination with any other aspect, the memory is configured to store control IDs, and the one or more processors is further configured to: store, a first control ID included in the first control message, into the memory for storing control IDs; retrieve the first a second control ID included in the second control message in the memory for storing control IDs; in response to a presence of the first control ID in the memory for storing control IDs identical to the second control ID, determine that the first control message and the second control message indicates a same action to be performed by the smart device.

In a third aspect, alone or in combination with any other aspect, for executing an action indicated by one of the first control message and the second control message, the one or more processors is further configured to: in response to an absence of the first control ID in the memory for storing control IDs, execute perform an action indicated by the first second control message, and store the second control ID in the memory for storing control IDs, and in response to a presence of a first control ID identical to the second control ID in the memory for storing control IDs, ignore the second control message.

In a fourth aspect, alone or in combination with any other aspect, wherein the action indicated by the first control message is same as an action indicated by the second control message if the second control ID is identical to the first control ID.

In a fifth aspect, alone or in combination with any other aspect, wherein each control ID stored in the memory for storing control IDs corresponds to an action executed by the smart device.

In a sixth aspect, alone or in combination with any other aspect, wherein the one or more processors is further configured to: remove, from the memory for storing control IDs, a control ID that exceeds a predetermined aging time, or remove, from the memory for storing control IDs, a control ID with the oldest timestamp, in responding to reaching a maximum number of entries of the memory for storing control IDs.

In a seventh aspect, alone or in combination with any other aspect, the first control message is received through a first communication connection and the second control message is received through a second communication connection, wherein, the first communication connection and the second communication connection are different communication connection.

In an eighth aspect, alone or in combination with any other aspect, wherein a first set of communication devices is present on a path of the first communication connection for transmitting the first control message to the smart device, a second set of communication devices is present on a path of the second communication connection for transmitting the second control message to the smart device, and the first set of communication devices is different from the second set of communication devices.

In a ninth aspect, alone or in combination with any other aspect, wherein, the first communication connection is one of a BLE Mesh direct control connection, a connection via a Wi-Fi proxy device, Wi-Fi direct control connection and a connection via cloud server relay control, and the second communication connection is one of a BLE Mesh direct control connection, a connection via a Wi-Fi proxy device, Wi-Fi direct control connection and a connection via cloud server relay control.

In a tenth aspect, alone or in combination with any other aspect, wherein the one or more processors is further configured to: broadcast a first election message comprising a first election priority value associated with the smart device, in responding to initiating a Wi-Fi proxy device election procedure; and broadcast a second election message comprising a second election priority value associated with a candidate device, in responding to receiving the second election message from the candidate device during the Wi-Fi proxy device election procedure, and the second election priority value being higher than the first election priority value.

In an eleventh aspect, alone or in combination with any other aspect, wherein one or more processors is further configured to: periodically broadcast a proxy heartbeat message declaring existence of the smart device as an elected Wi-Fi proxy device, wherein the broadcasting is performed subsequent to the smart device being elected as the Wi-Fi proxy device during the Wi-Fi proxy device election procedure.

In a twelfth aspect, alone or in combination with any other aspect, wherein, the one or more processors is further configured to: initiate the Wi-Fi proxy device election procedure responsive to failing to receive, within a predetermined time period, a proxy heartbeat message from a current Wi-Fi proxy device.

In a thirteenth aspect, alone or in combination with any other aspect, a method for wireless communication performed by a smart device is provided. The method comprises: receiving a first control message that complies with a first communication protocol and a second control message that complies with a second communication protocol, wherein the first control message and the second control message indicates a same action to be performed by the smart device; and executing an action indicated by one of the first control message and the second control message, wherein the first communication protocol is different from the second communication protocol.

In a fourteenth aspect, alone or in combination with any other aspect, the method further comprising storing, a first control ID included in the first control message, into the the memory for storing control IDs, retrieving a second control ID included in the second control message in the memory for storing control IDs; and in response to a presence of the first control ID in the memory for storing control IDs identical to the second control ID, determining that the first control message and the second control message indicates a same action to be performed by the smart device.

In a fifteenth aspect, alone or in combination with any other aspect, executing an action indicated by one of the first control message and the second control message comprising: in response to an absence of the first control ID in the memory for storing control IDs, executing an action indicated by the second control message, and storing the second control ID in the memory for storing control IDs, and in response to the presence of the first control ID in the memory for storing control IDs identical to the second control ID, ignoring second control message.

In a sixteenth aspect, alone or in combination with any other aspect, wherein the action indicated by the first control message is same as an action indicated by the second control message if the second control ID is identical to the first control ID.

In a 17th aspect, alone or in combination with any other aspect, wherein each control ID stored in the memory for storing control IDs corresponds to an action recently executed.

In a 18th aspect, alone or in combination with any other aspect, the method further comprises removing, from the memory for storing control IDs, a control ID that exceeds a predetermined aging time, or removing, from the memory for storing control IDs, a control ID with the oldest timestamp, in responding to reaching a maximum number of entries of the memory for storing control IDs.

In a 19th aspect, alone or in combination with any other aspect, the first control message is received through a first communication connection and the second control message is received through a second communication connection, wherein, the first communication connection and the second communication connection are different communication connection.

In a 20th aspect, alone or in combination with any other aspect, wherein, a first set of communication devices is present on a path of the first communication connection for transmitting the first control message to the smart device, a second set of communication devices is present on a path of the second communication connection for transmitting the second control message to the smart device, and the first set of communication devices is different from the second set of communication devices.

In a 21st aspect, alone or in combination with any other aspect, wherein, the first communication connection is one of a BLE Mesh direct control connection, a connection via a Wi-Fi proxy device, Wi-Fi direct control connection and a connection via cloud server relay control, and the second communication connection is one of a BLE Mesh direct control connection, a connection via a Wi-Fi proxy device, Wi-Fi direct control connection and a connection via cloud server relay control.

In an 22nd aspect, alone or in combination with any other aspect, wherein, the method further comprises broadcasting a first election message comprising a first election priority value associated with The method, in responding to initiating a Wi-Fi proxy device election procedure; and broadcasting a second election message comprising a second election priority value associated with a candidate device, in responding to receiving the second election message from the candidate device during the Wi-Fi proxy device election procedure, and the second election priority value being higher than the first election priority value.

In a 23rd aspect, alone or in combination with any other aspect, wherein, the method further comprises periodically broadcasting a proxy heartbeat message declaring existence of the smart device as an elected Wi-Fi proxy device, wherein the broadcasting is performed subsequent to the smart device being elected as the Wi-Fi proxy device during the Wi-Fi proxy device election, or initiating the Wi-Fi proxy device election responsive to failing to receive, within a predetermined time period, a proxy heartbeat message from a current Wi-Fi proxy device. The smart device being elected as the Wi-Fi proxy device only broadcasts the first election message and does not broadcast the second election message during the Wi-Fi proxy device election procedure.

In a 24th aspect, alone or in combination with any other aspect, a method for wireless communication performed by a smart home control system is provided. The method comprises sending, by the control terminal, a first control message that complies with a first communication protocol, the first control message including a first control ID; sending, by the control terminal, a second control message that complies with a second communication protocol, the second control message including a second control ID; receiving, by the smart device, the first control message and the second control message; determining, by the smart device, that the first control ID is identical to the second control ID, and executing an action indicated by one of the first control message and the second control message.

In a 25th aspect, alone or in combination with any other aspect, a smart device is provided. The smart device comprises a memory; and one or more processors operatively coupled to the memory. The one or more processors is configured to: broadcast a first election message comprising a first election priority value associated with the smart device, in responding to initiating a Wi-Fi proxy device election procedure, and broadcast a second election message comprising a second election priority value associated with a candidate device, in responding to receiving the second election message from the candidate device during the Wi-Fi proxy device election procedure, and the second election priority value being higher than the first election priority value.

In a 26th aspect, alone or in combination with any other aspect, a method for wireless communication is provided. The method comprises a memory; and one or more processors operatively coupled to the memory. The one or more processors is configured to: broadcasting a first election message comprising a first election priority value associated with the smart device, in responding to initiating a Wi-Fi proxy device election procedure, and broadcasting a second election message comprising a second election priority value associated with a candidate device, in responding to receiving the second election message from the candidate device during the Wi-Fi proxy device election procedure, and the second election priority value being higher than the first election priority value.

In a 27th aspect, alone or in combination with any other aspect, a method for wireless communication performed by a smart device is provided. The method comprises: receiving a first control message that complies with a first communication protocol, the first control message including a first control ID; retrieving the first control ID in a memory for storing control IDs; in response to an absence of the first control ID in the memory for storing control IDs, performing an action indicated by the first control message, and storing the first control ID in the memory for storing control IDs, and in response to a presence of a second control ID identical to the first control ID in the memory for storing control IDs, ignoring the first control message; wherein the second control ID is obtained from a second control message that complies with a second communication protocol, and the first communication protocol is different from the second communication protocol.

In a 28th aspect, alone or in combination with any other aspect, a smart device is provided. The smart device, comprising: a memory for storing control IDs for storing control IDs; and one or more processors operatively coupled to the memory for storing control IDs, the one or more processors configured to: receive a first control message that complies with a first communication protocol, the first control message including a first control ID; retrieve the first control ID in a memory for storing control IDs; in response to an absence of the first control ID in the memory for storing control IDs, perform an action indicated by the first control message, and store the first control ID in the memory for storing control IDs, and in response to a presence of a second control ID identical to the first control ID in the memory for storing control IDs, ignore the first control message; wherein the second control ID is obtained from a second control message that complies with a second communication protocol, and the first communication protocol is different from the second communication protocol.

Those of skill would appreciate that the logical blocks, circuits, and algorithm steps described here may be implemented as electronic hardware, computer software, or a combination. This interchangeability of hardware and software is shown by the illustrative components described functionally. Whether the functionality is implemented in hardware or software depends on the application and constraints. Experts may implement the functionality in various ways for each application, but those choices do not depart from the scope here. Experts also recognize the examples of components, methods, and interactions here are merely illustrative; the components, methods, or interactions may be combined or performed differently.

The illustrative logic, blocks, circuits, and processes described may be implemented as hardware, software, or a combination. This hardware and software interchangeability has been described generally in terms of functionality and illustrated in the components, blocks, circuits, and processes. Whether the functionality is implemented in hardware or software depends on the application and constraints.

In an embodiment of the present disclosure, the processor may be a logic computing device with data processing capabilities and/or program execution capabilities, such as a central processing unit (CPU), a field programmable logic array (FPGA), a single chip microcomputer (MCU), a digital signal processor (DSP), an application specific integrated circuit (ASIC), or the like. The memory may be, for example, a volatile memory and/or a non-volatile memory. The volatile memory may include, for example, a random access memory (RAM) and/or a cache (Cache) or the like. The non-volatile memory may include, for example, a read only memory (ROM), a mechanical hard disk (HDD), a solid state drive (SSD), a flash memory (Flash), a USB flash drive, a memory card (SD, CF, MicroSD, etc.), and the like.

It will be appreciated by a person skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "data block", "circuit", "engine", "unit," "circuit," or "system". Furthermore, aspects of the present disclosure may take the form of a computer program product embodied in one or more computer-readable media having computer-readable program code embodied thereon.

Certain terminology has been used to describe embodiments of the present disclosure. For example, the terms "first/second embodiment", "one embodiment", "an embodiment", and/or "some embodiments" mean that a particular feature, structure or characteristic described in connection with the embodiment is included in at least one embodiment of the present disclosure. Therefore, it is emphasized and is to be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, is to be interpreted as having the meaning that is consistent with their meaning in the context of the relevant art and will not be interpreted in an idealized or overly formal sense unless expressly so defined herein.

The above is illustration of the present disclosure and is not to be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it is not to be constructed as limited to the specific embodiments disclosed, and modifications to the present disclosure and other embodiments are included in the scope of the attached claims. The present disclosure is defined by the claims and their equivalents.

What claimed is:

1. A smart device, comprising:
   a memory; and
   one or more processors operatively coupled to the memory, the one or more processors configured to:
   receive a first control message that complies with a first communication protocol and a second control message that complies with a second communication protocol, wherein the first control message and the second control message indicate a same action to be performed by the smart device; and
   execute the action indicated by one of the first control message and the second control message,
   wherein the first communication protocol is different from the second communication protocol.

2. The smart device according to claim 1, wherein the memory is configured to store control IDs, and the one or more processors is further configured to:
   store, a first control ID included in the first control message, into the memory for storing control IDs;
   retrieve a second control ID included in the second control message in the memory for storing control IDs;
   in response to a presence of the first control ID in the memory for storing control IDs identical to the second control ID, determine that the first control message and the second control message indicates a same action to be performed by the smart device.

3. The smart device according to claim 2, wherein for executing an action indicated by one of the first control message and the second control message, the one or more processors is further configured to:

in response to an absence of the first control ID in the memory for storing control IDs, execute an action indicated by the second control message, and store the second control ID in the memory for storing control IDs, and in response to a presence of a first control ID identical to the second control ID in the memory for storing control IDs, ignore the second control message.

4. The smart device according to claim 1, wherein the action indicated by the first control message is same as an action indicated by the second control message if a second control ID in the second control message is identical to a first control ID in the first control message.

5. The smart device according to claim 1, wherein the memory is configured to store control IDs, and each control ID stored in the memory for storing control IDs corresponds to an action executed by the smart device.

6. The smart device according to claim 1, wherein the memory is configured to store control IDs, and the one or more processors is further configured to:

remove, from the memory for storing control IDs, a control ID that exceeds a predetermined aging time, or remove, from the memory for storing control IDs, a control ID with an oldest timestamp, in responding to reaching a maximum number of entries of the memory for storing control IDs.

7. The smart device according to claim 1, wherein the first control message is received through a first communication connection and the second control message is received through a second communication connection, wherein, the first communication connection and the second communication connection are different communication connections.

8. The smart device according to claim 7, wherein, a first set of communication devices is present on a path of the first communication connection for transmitting the first control message to the smart device, a second set of communication devices is present on a path of the second communication connection for transmitting the second control message to the smart device, and the first set of communication devices is different from the second set of communication devices.

9. The smart device according to claim 7, wherein, the first communication connection is one of a BLE Mesh direct control connection, a connection via a WIFI proxy device, WIFI direct control connection and a connection via cloud server relay control, and the second communication connection is one of a BLE Mesh direct control connection, a connection via a WIFI proxy device, WIFI direct control connection and a connection via cloud server relay control.

10. The smart device according to claim 1, wherein, the one or more processors is further configured to:

broadcast a first election message comprising a first election priority value associated with the smart device, in responding to initiating a WIFI proxy device election procedure; and broadcast a second election message comprising a second election priority value associated with a candidate device, in responding to receiving the second election message from the candidate device during the WIFI proxy device election procedure, and the second election priority value being higher than the first election priority value.

11. The smart device according to claim 10 wherein, the one or more processors is further configured to:

periodically broadcast a proxy heartbeat message declaring existence of the smart device as an elected WIFI proxy device, wherein the broadcasting is performed subsequent to the smart device being elected as the WIFI proxy device during the WIFI proxy device election procedure, wherein the smart device being elected as the WIFI proxy device only broadcasts the first election message and does not broadcast the second election message during the WIFI proxy device election procedure.

12. The smart device according to claim 10, wherein, the one or more processors is further configured to:

initiate the WIFI proxy device election procedure responsive to failing to receive, within a predetermined time period, a proxy heartbeat message from a current WIFI proxy device.

13. A method for wireless communication performed by a smart device, comprising:

receiving a first control message that complies with a first communication protocol and a second control message that complies with a second communication protocol, wherein the first control message and the second control message indicate a same action to be performed by the smart device;

executing an action indicated by one of the first control message and the second control message, wherein the first communication protocol is different from the second communication protocol.

14. The method according to claim 13, further comprising:

storing, a first control ID included in the first control message, into the thea memory for storing control IDs, retrieving a second control ID included in the second control message in the memory for storing control IDs; and in response to a presence of the first control ID in the memory for storing control IDs identical to the second control ID, determining that the first control message and the second control message indicates a same action to be performed by the smart device.

15. The method according to claim 13, wherein executing an action indicated by one of the first control message and the second control message comprising:

in response to an absence of the first control ID in a memory for storing control IDs, executing an action indicated by the second control message, and storing the second control ID in the memory for storing control IDs, and in response to the presence of the first control ID in the memory for storing control IDs identical to the second control ID, ignoring second control message.

16. The method according to claim 13, wherein the action indicated by the first control message is same as an action indicated by the second control message if the second control ID is identical to the first control ID, and each control ID stored in a memory for storing control IDs corresponds to an action executed.

17. The method according to claim 13, further comprising:

removing, from a memory for storing control IDs, a control ID that exceeds a predetermined aging time, or removing, from the memory for storing control IDs, a control ID with an oldest timestamp, in responding to reaching a maximum number of entries of the memory for storing control IDs.

18. The method according to claim 13, wherein the first control message is received through a first communication connection and the second control message is received through a second communication connection,
- wherein, the first communication connection and the second communication connection are different communication connection,
- wherein, a first set of communication devices is present on a path of the first communication connection for transmitting the first control message to the smart device, a second set of communication devices is present on a path of the second communication connection for transmitting the second control message to the smart device, and the first set of communication devices is different from the second set of communication devices.

19. The method according to claim 18, wherein,
the first communication connection is one of a BLE Mesh direct control connection, a connection via a WIFI proxy device, WIFI direct control connection and a connection via cloud server relay control, and the second communication connection is one of a BLE Mesh direct control connection, a connection via a WIFI proxy device, WIFI direct control connection and a connection via cloud server relay control.

20. The method according to claim 13, further comprising:
- broadcasting a first election message comprising a first election priority value associated with the smart device, in responding to initiating a WIFI proxy device election procedure; and broadcasting a second election message comprising a second election priority value associated with a candidate device, in responding to receiving the second election message from the candidate device during the WIFI proxy device election procedure, and the second election priority value being higher than the first election priority value.

* * * * *